United States Patent [19]

Bonser et al.

[11] B 3,914,741

[45] Oct. 21, 1975

[54] FAULT DETECTION ARRANGEMENT FOR DIGITAL TRANSMISSION SYSTEM

[75] Inventors: Richard Harlan Bonser, North Aurora; Robert Joseph Willett, Winfield, both of Ill.

[73] Assignee: Bell Telephone Laboratories, Incorporated, Murray Hill, N.J.

[22] Filed: Nov. 1, 1973

[21] Appl. No.: 411,633

[44] Published under the Trial Voluntary Protest Program on January 28, 1975 as document no. B 411,633.

[52] U.S. Cl. .......................... 340/146.1 C; 340/163

[51] Int. Cl.$^2$ .......................... H04L 1/10

[58] Field of Search ............ 340/146.1 C, 163, 155, 340/172.5, 147 C

[56] References Cited

UNITED STATES PATENTS

| | | | |
|---|---|---|---|
| 3,069,657 | 12/1962 | Green, Jr. et al. | 340/146.1 C |
| 3,287,697 | 11/1966 | Jackel | 340/146.1 C |
| 3,384,873 | 5/1968 | Sharma | 340/146.1 C |
| 3,551,885 | 12/1970 | Henzel | 340/146.1 C |
| 3,735,351 | 5/1973 | Macheel | 340/146.1 C |

*Primary Examiner*—Malcolm A. Morrison
*Assistant Examiner*—David H. Malzahn
*Attorney, Agent, or Firm*—J. C. Albrecht

[57] ABSTRACT

A digital information transmission system includes a control unit for transmitting digital words each including an address, message, and an error detecting code derived from the address and messsage to a plurality of uniquely addressable peripheral units over a common bus. Each peripheral unit includes a register which stores its address and when a digital word is received by a peripheral unit the address stored in its register is compared with the transmitted address and the transmitted error detecting code is compared with an error detection code generated from the received message and the stored digital address. When both the transmitted and the stored addresses match and the transmitted and the generated error detecting codes match, the utilization portion of the peripheral unit is enabled to respond to the transmitted message.

7 Claims, 1 Drawing Figure

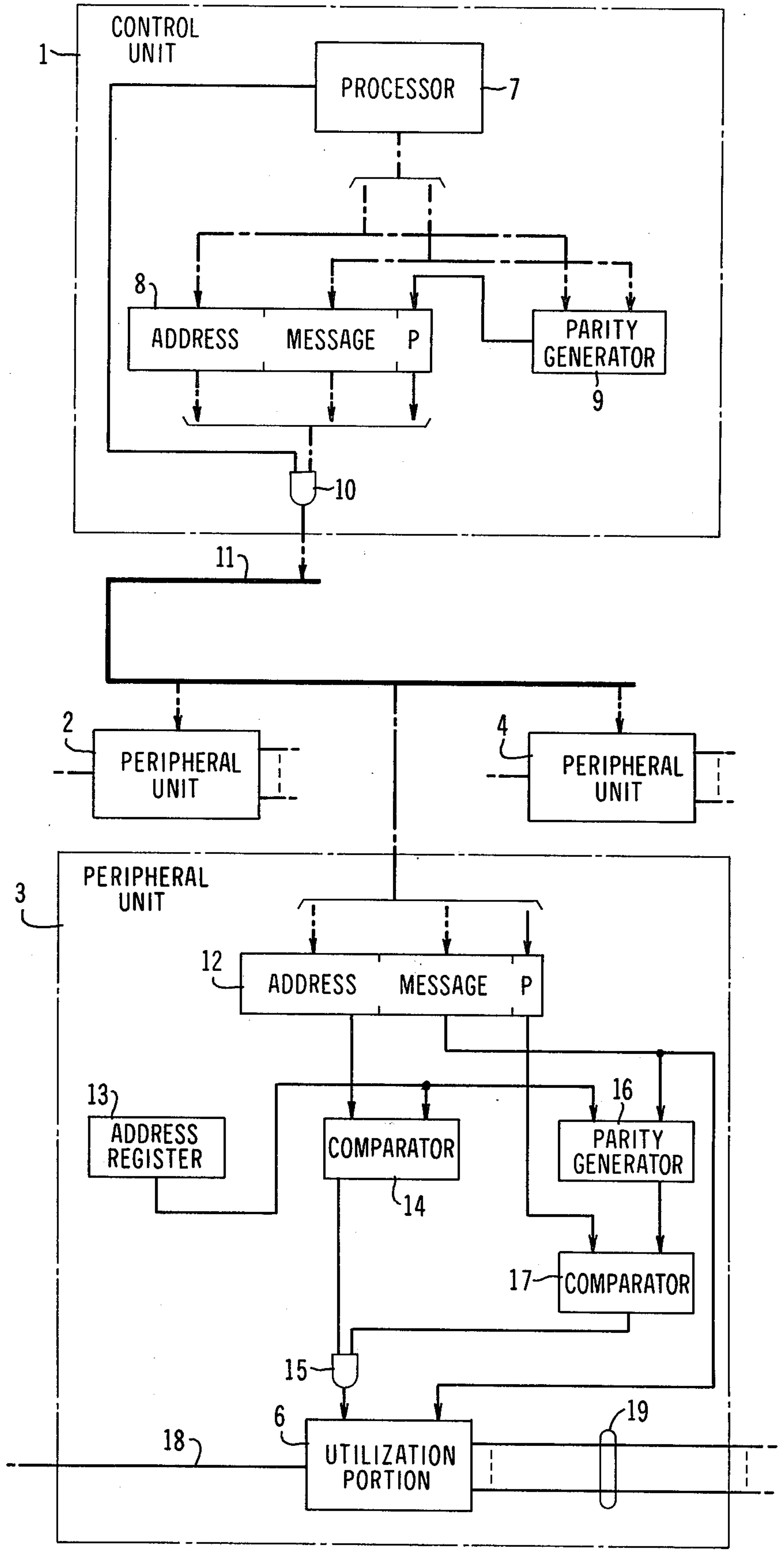
CONTROL UNIT
1
PROCESSOR
7
8
ADDRESS
MESSAGE
P
PARITY GENERATOR
9
10
11
2
PERIPHERAL UNIT
4
PERIPHERAL UNIT
PERIPHERAL UNIT
3
12
ADDRESS
MESSAGE
P
13
ADDRESS REGISTER
COMPARATOR
14
16
PARITY GENERATOR
17
COMPARATOR
15
6
UTILIZATION PORTION
18
19

FAULT DETECTION ARRANGEMENT FOR DIGITAL TRANSMISSION SYSTEM

BACKGROUND OF THE INVENTION

This invention relates to error and fault detection arrangements for use in digital information transfer systems.

One type of commonly used digital information transfer system includes a control unit which, from time to time, communicates with one or more units peripheral to it. These peripheral units are generally memories of varying types, display devices, controlled switching units, etc. Each of the peripheral units includes a storage register which contains a preassigned digital address. In order to communicate with a selected peripheral unit or group of such peripheral units the control unit transmits the message to be conveyed and the address of the selected peripheral unit or group of units over a common bus to all of the peripheral units. The peripheral units having an address stored in their respective storage registers which matches the transmitted address enable their utilization portions to receive the transmitted message.

In previous arrangements for detecting errors in the digital information transferred between the control unit and peripheral units, the control unit derives parity check bits from the address and message, which check bits are transmitted along with the address and message to the peripheral units. Each peripheral unit, upon receipt of the address, message, and parity check bits, derives parity check bits from the received address and message. The parity check bits derived from the address and message received at the peripheral unit are then compared with the parity bits received from the control unit and if the two are identical it is assumed that no transmission errors occurred. The utilization portion of each peripheral unit is then enabled if a match is indicated between the address contained by the storage register of that peripheral unit and the transmitted address.

With such prior art systems it is possible that the address and message could be transmitted without error but due to faulty peripheral unit circuitry an address match might be indicated when none, in fact, exists. In this situation, no error or fault is detected and a peripheral unit which should not respond is enabled. The enabling of an improper peripheral unit can result in the loss of valuable system information or in the performance of functions by the wrong unit.

SUMMARY OF THE INVENTION

The present invention employs one error detecting code transmitted to the peripheral units with the address and message to protect against both transmission errors and the improper selection of peripheral units due to circuit faults. This protection is provided by comparing the transmitted error detecting code with an error detecting code derived from the received message and the address contained by the storage register of the peripheral unit.

A digital information transfer system in accordance with the present invention comprises a control unit and at least one peripheral unit wherein each peripheral unit includes a storage register for storing its preassigned digital address. The control unit directs digital messages to given peripheral units by transmitting to all of the peripheral units the address of the designated peripheral units along with a digital message and an error detecting code derived at the control unit from both the designated digital address and the digital message. Each peripheral unit not only compares the address it receives from the control unit with the address in its storage register but also compares the received error detecting code with an error detecting code derived at the peripheral unit from the combination of the received digital message and the digital address stored at the peripheral unit. When a peripheral unit determines both that the transmitted and stored addresses match and that the error detecting code generated at the peripheral unit matches the error detecting code transmitted from the control unit, the peripheral unit is enabled. In this manner, errors occurring in information transmission and in peripheral unit selection can both be detected using a single error detecting code. As a result, the present invention provides protection from circuitry faults, which protection was not provided by the prior art, without increasing the complexity of the error detecting code or the fault detection circuitry beyond that of the prior art.

DETAILED DESCRIPTION

The sole FIGURE of the drawing shows a portion of a telephone switching system embodying the present invention. This system comprises a switching control unit 1 and three peripheral units 2, 3, and 4 which are assigned the digital addresses "01", "10", and "11", respectively. Control unit 1 includes an information processor 7 which controls a telephone switching system by operating in accordance with a stored program to perform data manipulations to make decisions based on data and to communicate with peripheral units 2, 3, and 4 by transmitting digital messages to them. Information processor 7 may, by way of example, be the central processor 100 described in U.S. Pat. No. 3,570,008 which issued Mar. 9, 1971, to R. W. Downing et al. Each of the peripheral units 2, 3, and 4 includes a utilization portion 6 which is connected to an input conductor 18 and a group of output conductors 19. In the present embodiment utilization portions 6 of peripheral units 2, 3, and 4 are controlled switching units which respond to digital messages from control unit 1 by completing or removing a conductive path between their associated input conductor 18 and one of their associated output conductors 19. An example of controlled switching units which may be used in utilization portions 6 is the network controller 122 and the line link network 121 of the aforementioned R. W. Downing et al. patent. These possible conductive paths are, by way of example, portions of telephone talking circuits. In operation, control unit 1 directs a digital message to a selected one of peripheral units 2, 3, and 4 by transmitting the address assigned to the selected peripheral unit along with the message. The utilization portion of the addressed peripheral unit responds to the digital message by completing or removing telephone talking paths in accordance with the transmitted message.

Control unit 1 comprises an information processor 7, an output register 8 having address, message, and parity bit positions, and a parity generator 9. Information processor 7 responds to a stored program to perform data manipulations, to make decisions based on data, and to communicate with peripheral units 2, 3, and 4 in a manner well known in the art. Periodically information processor 7 determines that a switching operation must be performed by one of the peripheral units 2, 3, or 4. This switching operation, for example, could be required to complete a telephone talking path. When such determination is made, information processor 7 transmits a digital message defining the required switching operation and the address of the peripheral unit which is to perform it to output register 8 and to parity generator 9. Parity generator 9 is an even parity generator which generates a partiy bit "1" when an odd number of "1s" is present in the combined address and message and a parity bit "0" when an even number of "1s" exists in the combined address and message. The output of parity generator 9 is applied to the parity bit portion of output register 8.

When a switching operation defined by the digital message "010" is to be performed by peripheral unit 3, information processor 7 transmits the address "10" of peripheral unit 3 and the message "010" to output register 8 and parity generator 9. In response to this combined message and address, parity generator 9 generates a "0" parity bit for reasons previously described and supplies this "0" to the parity bit portion of output register 8. When the address, message, and parity bit have all been placed in output register 8 information processor 7 supplies a gating signal to an AND gate 10 which applies the contents of output register 8 to a transmission bus 11. In this present embodiment the gating signal is generated by information processor 7 a fixed period of time after the address and message are supplied to output register 8. By connection to bus 11 an input register 12 located in each of the peripheral units 2, 3, and 4 receives the message, address, and parity bit from control unit 1. If no transmission errors occur, input register 12 of each of the peripheral units 2, 3, and 4 receives the address "10", the message "010", and a parity bit "0".

Each of the peripheral units 2, 3, and 4 includes an address register 13 which contains the digital address assigned to it. The peripheral units 2, 3, and 4 are substantially identical so only peripheral unit 3 is shown in detail in the figure. In the present embodiment, the addresses "01", "10", and "11" are stored in the address registers 13 of peripheral units 2, 3, and 4, respectively. In each of the peripheral units 2, 3, and 4 the address portion of the contents of the input register 12 and the contents of the address register 13 are both applied to a comparator 14. Comparator 14 responds to these inputs by generating a logical "1" output when they are identical and a logical "0" output when they are not identical. The output of comparator 14 is applied to an AND gate 15. Assuming that no faults occur in the operation of any of the comparators 14 a logical "1" is transmitted to AND gate 15 of peripheral unit 3 since the received address and the address in the address register 13 of peripheral unit 3 are both "10". The comparators 14 in both of the peripheral units 2 and 4 apply a logical "0" to their respective AND gates 15 since the address stored in their address register 13 does not match the address portion of the contents of input register 12.

At substantially the same time that comparator 14 is comparing the stored and received addresses the message portion of the contents of input register 12 and the address stored by address register 13 are both applied to a parity generator 16. Parity generator 16 is an even parity generator which responds to its input in the manner described for parity generator 9. The parity bit generated by parity generator 16 is transmitted to a comparator 17 where it is compared with the parity bit portion of input register 12. When the parity bit from parity bit generator 16 is identical to the parity bit contained in input register 12, comparator 17 transmits a logical "1" to AND gate 15. On the other hand, when comparator 17 detects that its two inputs are not identical a logical "0" is transmitted to AND gate 15.

In accordance with the present example, parity generator 16 of peripheral unit 3 receives the message "010" from input register 12 and the address "10" from address register 13 resulting in the generation of a parity bit equal to "0". This derived parity bit is identical to the parity bit contained in input register 12 so a logical "1" is transmitted to AND gate 15. The output of AND gate 15 becomes a logical "1" in response to the logical "1" inputs from comparators 14 and 17. This logical "1" is applied to utilization portion 6 which is enabled by it to respond to the message contained in input register 12. Since comparators 14 of peripheral units 2 and 4 are transmitting logical "0s" to their respective AND gates 15 the utilization portions 6 of these peripheral units 2 and 4 are not enabled since their associated AND gates 15 cannot generate a logical "1" output.

The above description concerns a situation where no errors or faults occur. The present invention provides security against two of the most common errors and faults which occur to such systems. As an example, assume that address "11", message "010", and parity bit "1" are transmitted from control unit 1 but due to transmission errors address "10", message "010", and parity bit "1" are received by each of the peripheral units 2, 3, and 4. The utilization portions 6 of peripheral units 2 and 4 are not enabled since their associated comparators 14 will apply a logical "0" to their associated AND gates 15 due to the mismatch between the received address and the address in their address registers 13. Comparator 14 of peripheral unit 3, however, applies a logical "1" to its AND gate 15 since the received address and the address in its address register 13 are identical. Additionally, parity generator 16 of peripheral unit 3 receives the address "10" from address register 13 and message "010" from input register 12 and generates a parity bit of "0". When this "0" parity bit is compared with the "1" parity bit from input register 12 comparator 17 applies a logical "0" to AND gate 15 which keeps utilization portion 6 of peripheral unit 3 from being enabled. Thus, no utilization portion is enabled in response to transmission errors.

If, in the immediately preceding example, the transmission error occurred in the message portion instead of the address portion, no address match is indicated by the comparators 14 of peripheral units 2 and 3. An address match does occur in peripheral unit 4 but, as before, a parity mismatch is detected by comparator 17 which keeps utilization portion 6 of peripheral unit 4 from being enabled.

The present invention uses the same error code and operation to protect against the common fault of incorrect operation by comparator 14. In this example, it is assumed that address "11", message "010", and parity bit "1" are transmitted from the control unit 1 and properly received by each of the peripheral units 2, 3, and 4. However, comparator 14 of peripheral unit 3 is assumed to have a fault which causes it to generate a logical "1" output in response to the received address "11" when such an output should be generated only in response to a received address of "10". Peripheral unit 2 does not enable its utilization portion 6 since its comparator 14 applies a logical "0" to its AND gate 15 due to a mismatch of stored and received addresses. Peripheral unit 4 enables its utilization portion 6 since the stored address and the transmitted address match and both the parity derived by parity generator 16 and that received are identical. Due to the above described fault in comparator 14 of peripheral unit 3 its AND gate 15 receives a logical "1" from comparator 14 indicating a match of addresses where none actually exists. However, peripheral unit 3 does not become enabled due to the error detection circuitry. Parity generator 16 of peripheral unit 3 receives the address "10" from address register 13 and the message "010" from input register 12. Parity generator 16 in response to these inputs generates a parity bit "0" as its output. Comparator 17 then receives the parity bit of "0" from parity generator 16 and a parity bit of "1" from input register 12. In response to this mismatch of parity bits, comparator 17 transmits a logical "0" to AND gate 15. In this manner, utilization portion 6 of peripheral unit 3 is not enabled even though the erroneous match of addresses was indicated. If the prior art systems which only check the parity computed from the received address and message were used in the above example, peripheral unit 3 would have been erroneously enabled. This would have occurred since a match of addresses would have been generated and the received message and address had the correct parity.

When additional security is desired over the address stored in address register 13, a parity bit representing the even parity of the stored address can also be stored in register 13. In this situation the address stored in address register 13 is applied to comparator 14 and the parity bit stored in address register 13 is applied to parity generator 16 instead of the stored address. Parity generator 16 then generates a parity bit from the combination of the received message and the parity bit stored in address register 13. The parity bit generated by parity generator 16 is then used in the manner described in the previous examples.

In the previous examples, only the detection of single bit errors was discussed. This is a function of the error code used in this system. By using error codes having multibit error detection capabilities the system described can be used to protect against such multibit faults and errors. As an example, if parity generators 9 and 16 were replaced with error detecting code generators which produce an error detecting code having three bit error detecting capabilities, the error and faults detected by the entire system would likewise be increased.

What is claimed is:

1. In an information receiving circuit for receiving digital words which comprise a digital address portion, a digital message portion, and an error detecting code portion derived from the combination of said digital address and said digital message a protection arrangement comprising means for storing a digital address, means for comparing the digital address portion of a received digital word with the digital address stored in said storage means, encoding means for deriving an error detecting code from the combination of the digital message portion of a received digital word and the digital address stored in said storage means, means for comparing the error detecting code derived by said encoding means with the error detecting code portion of a received digital word, and means for generating an enable signal when both of said means for comparing indicate that their respective compared quantities are identical.

2. The information receiving circuit in accordance with claim 1 further including a utilization means which is enabled to respond to the message portion of a received digital word when said enable signal is generated.

3. An information transmission system which includes a source of digital words each comprising a digital address, a digital message, and an error detecting code derived from the combination of said digital address and said digital message, and at least one receiving means for receiving said digital words further comprising storage means for storing a digital address, means for comparing a digital address received by said receiving means with the digital address stored in said storage means, encoding means for deriving an error detecting code from the combination of a message received by said receiving means and the digital address stored in said storage means, means for comparing the error detecting code derived by said encoding means with an error detecting code received by said receiving means, and means for generating an enable signal when both of said means for comparing indicate that their respective compared quantities are identical in response to one of said digital words.

4. The information transmission system in accordance with claim 3 wherein each of said storage means stores a digital address unique to its associated receiving means.

5. The information transmission system in accordance with claim 4 wherein said receiving means further include a utilization means which is enabled to respond to the message portion of a received digital word when said enable signal is generated.

6. An information transmission system which includes a source of digital words each comprising a digital address, a digital message, and an error detecting code derived from the combination of said digital address and said digital message and at least one receiving means for receiving said digital words further comprising storage means for storing a digital address and an error detecting code derived from said digital address, means for comparing a digital address received by said receiving means with the digital address stored in said storage means, encoding means for deriving an error detecting code from the combination of a message received by said receiving means and the error detecting code stored in said storage means, means for comparing the error detecting code derived by said encoding means with an error detecting code received by said receiving means, and means for generating an enable signal when both of said means for comparing indicate that their respective compared quantities are identical in response to one of said digital words.

7. A digital information transfer system comprising:

a central control unit and a plurality of peripheral units each having a corresponding unique digital address;

said central control unit comprising means for generating digital words each comprising a digital message portion and the digital address of any selected one of said peripheral units, means to derive at least one parity check digit from said digital word and means to transmit said digital word and said parity check digit to said peripheral units; and wherein each of said peripheral units comprises means defining the digital address of the respective peripheral unit, means for comparing the received digital address with said defined digital address, means to derive at least one parity check digit from the received digital message and the defined digital address, means for comparing the received parity check digit with the parity check digit derived from said received digital message and said defined digital address, and means to enable the respective peripheral unit to respond to said received message when matches are indicated by both of said comparing means.

* * * * *